United States Patent
Park

(10) Patent No.: US 6,684,078 B1
(45) Date of Patent: Jan. 27, 2004

(54) GPS DATA CONTROLLER IN MOBILE COMMUNICATION SYSTEM AND CONTROL METHOD THEREOF

(75) Inventor: Yong-Pal Park, Chungcheongbuk-do (KR)

(73) Assignee: Hyundai Electronics Industries Co., Ltd., Kyoungki-do (KR)

( * ) Notice: Subject to any disclaimer, the term of this patent is extended or adjusted under 35 U.S.C. 154(b) by 0 days.

(21) Appl. No.: 09/499,630

(22) Filed: Feb. 8, 2000

(30) Foreign Application Priority Data

Feb. 23, 1999 (KR) .............................. 99-5906

(51) Int. Cl.[7] .............................................. H04Q 7/20
(52) U.S. Cl. ................. 455/456; 455/456.1; 455/456.3; 342/357.09; 342/357.12; 342/357.13
(58) Field of Search ............................. 455/456, 412.1, 455/517, 456.1, 456.2, 456.3, 456.5, 456.6, 456.7; 342/357.09, 357.1, 357.12, 357.13

(56) References Cited

U.S. PATENT DOCUMENTS

| 5,103,459 A | | 4/1992 | Gilhousen | |
|---|---|---|---|---|
| 5,969,673 A | * | 10/1999 | Bickley et al. | 342/357.09 |
| 5,999,126 A | * | 12/1999 | Ito | 342/357.1 |
| 6,049,718 A | * | 4/2000 | Stewart | 455/456 |
| 6,061,561 A | * | 5/2000 | Alanara et al. | 455/422 |
| 6,081,229 A | * | 6/2000 | Soliman et al. | 342/357.05 |
| 6,222,483 B1 | * | 4/2001 | Twitchell et al. | 342/357.09 |
| 6,240,069 B1 | * | 5/2001 | Alperovich et al. | 370/260 |
| 6,272,430 B1 | * | 8/2001 | Krasner | 701/207 |
| 6,360,101 B1 | * | 3/2002 | Irvin | 455/456 |
| 6,426,693 B1 | * | 7/2002 | Inomata | 340/425.5 |

* cited by examiner

Primary Examiner—Edward F. Urban
Assistant Examiner—Simon Nguyen
(74) Attorney, Agent, or Firm—Birch, Stewart, Kolasch & Birch, LLP

(57) ABSTRACT

A mobile communication system includes a signal processor, a first memory, a controller, and an input-output controller. The signal processor receives first forward GPS data and transmits backward GPS data. The first memory has a preamble area, a base station information area, a time information area, and a location information area and stores the backward GPS data, the first forward GPS data, and second forward GPS data received by an exterior GPS receiver. The controller controls data input and output over the first memory and controls transmission of the backward GPS data stored in the first memory to the signal processor. The input-output controller is controlled by the controller and transmits the second forward GPS data to the first memory.

26 Claims, 9 Drawing Sheets

GPS DATA CONTROLLER IN MOBILE COMMUNICATION SYSTEM AND CONTROL METHOD THEREOF

BACKGROUND OF THE INVENTION

1. Field of the Invention

The present invention relates to a mobile communication system and more particularly to an apparatus and method for communicating data using a code division multiple access (CDMA) system in a CDMA cellular phone.

2. Description of Related Art

The CDMA system, which is one of multiplex operation systems, makes multiple mobile stations share frequency and time and allocates a pseudorandom sequence to each mobile station. The mobile station at a transmitting party spreads transmitting signals through the pseudorandom sequence to transmit the signals. The mobile station at a receiving party generates the same pseudorandom sequence as that used at the transmitting party to synchronize received signals and despreads the received signals to recover the signals.

The CDMA system employing a band spread communication technique that has been basically used for a long time considerably enhances efficiency in using frequency in addition to all advantages of the band spread communication technique. In other words, since the same frequency band can be used in all service areas, in the aspect of the cellular concept, a frequency reuse coefficient is "1", so the CDMA system effects much higher frequency use efficiency compared with other communication systems. Soft handover can also be accomplished because the same frequency band can be used in all service areas. Furthermore, the CDMA system ensures an excellent privacy communication feature in a radio communication section since it uses different codes for each communication.

FIG. 1 is a block diagram showing a configuration of a conventional CDMA cellular phone. As shown in FIG. 1, RF/analog sub-system 102 performs frequency synchronization of received signals and power control of transmitting signals and also generates system clocks. Baseband analog (BBA) 104 comprises up/down converter and filter, a D/A converter, and an A/D converter. The baseband analog 104 processes voice data that is not modulated. Mobile station modem (MSM) 106 comprises CDMA demodulator 108, interleaver modulator 110, and Viterbi decoder 112. The CDMA demodulator 108 demodulates the received signals. The interleaver modulator 110 modulates and sends the transmitting signals to the baseband analog 104. The Viterbi decoder 112 compensates the received signals for errors. Universal asynchronous receiver transmitter (UART) 118 is an input/output interface connecting to exterior devices.

Such conventional CDMA cellular phone does not have a function of receiving Global Positioning System (GPS) data. If the function of transmitting and receiving the GPS data is added to the conventional CDMA cellular phone and calculation of location information from received GPS data is allowed, a user can transmit his/her location information to a base station or another user through the CDMA cellular phone and receive GPS data from the base station to appreciate his/her present location, thus doubling the value of the conventional CDMA cellular phone.

SUMMARY OF THE INVENTION

Accordingly, the present invention is directed to a GPS data controller in a mobile communication system and a control method thereof that substantially obviates one or more of the limitations and disadvantages of the related art.

An objective of the present invention is to provide a mobile communication system which can transmit and receive GPS data by adding a buffer for storing the GPS data and a memory for storing location information of a base station and controlling the system through a central processing unit (CPU).

Additional features and advantages of the invention will be set forth in the following description, and in part will be apparent from the description, or may be learned by practice of the invention. The objectives and other advantages of the invention will be realized and attained by the structure as illustrated in the written description and claims hereof, as well as the appended drawings.

To achieve these and other advantages, and in accordance with the purpose of the present invention as embodied and broadly described, a mobile communication system comprises a signal processor, a first memory, a controller, and an input-output controller. The signal processor receives first forward GPS data and transmits backward GPS data. The first memory has a preamble area, a base station information area, a time information area, and a location information area and stores the backward GPS data, the first forward GPS data, and second forward GPS data received by an exterior GPS receiver. The controller controls data input and output over the first memory and controls transmission of the backward GPS data stored in the first memory to the signal processor. The input-output controller is controlled by the controller and transmits the second forward GPS data to the first memory.

In another aspect of the present invention, a data transmitting method of a mobile communication system has a first mode and a second mode. In the first mode, GPS data stored in a GPS data memory is transmitted to a preselected telephone number. In the second mode, the GPS data is transmitted to a telephone number currently connected for communication in a GPS transmitting mode.

In further another aspect of the present invention, a data receiving method has a first mode and a second mode. In the first mode, time information and location information from a GPS receiver is displayed via an exterior display unit when the GPS receiver is connected. In the second mode, at least three pieces of GPS data are received from different base stations, time information and location information is calculated from the received GPS data, and the information is displayed via the exterior display unit when the GPS receiver is not connected.

It is to be understood that both the foregoing general description and the following detailed description are exemplary and explanatory and are intended to provide further explanation of the invention as claimed.

BRIEF DESCRIPTION OF THE ATTACHED DRAWINGS

The accompanying drawings, which are included to provide a further understanding of the invention and are incorporated in and constitute a part of this specification, illustrate embodiments of the invention and together with the description serve to explain the principles of the invention.

DETAILED DESCRIPTION OF PREFERRED EMBODIMENT

Reference will now be made in detail to the preferred embodiments of the present invention, examples of which are illustrated in the accompanying drawings.

Figure 1:
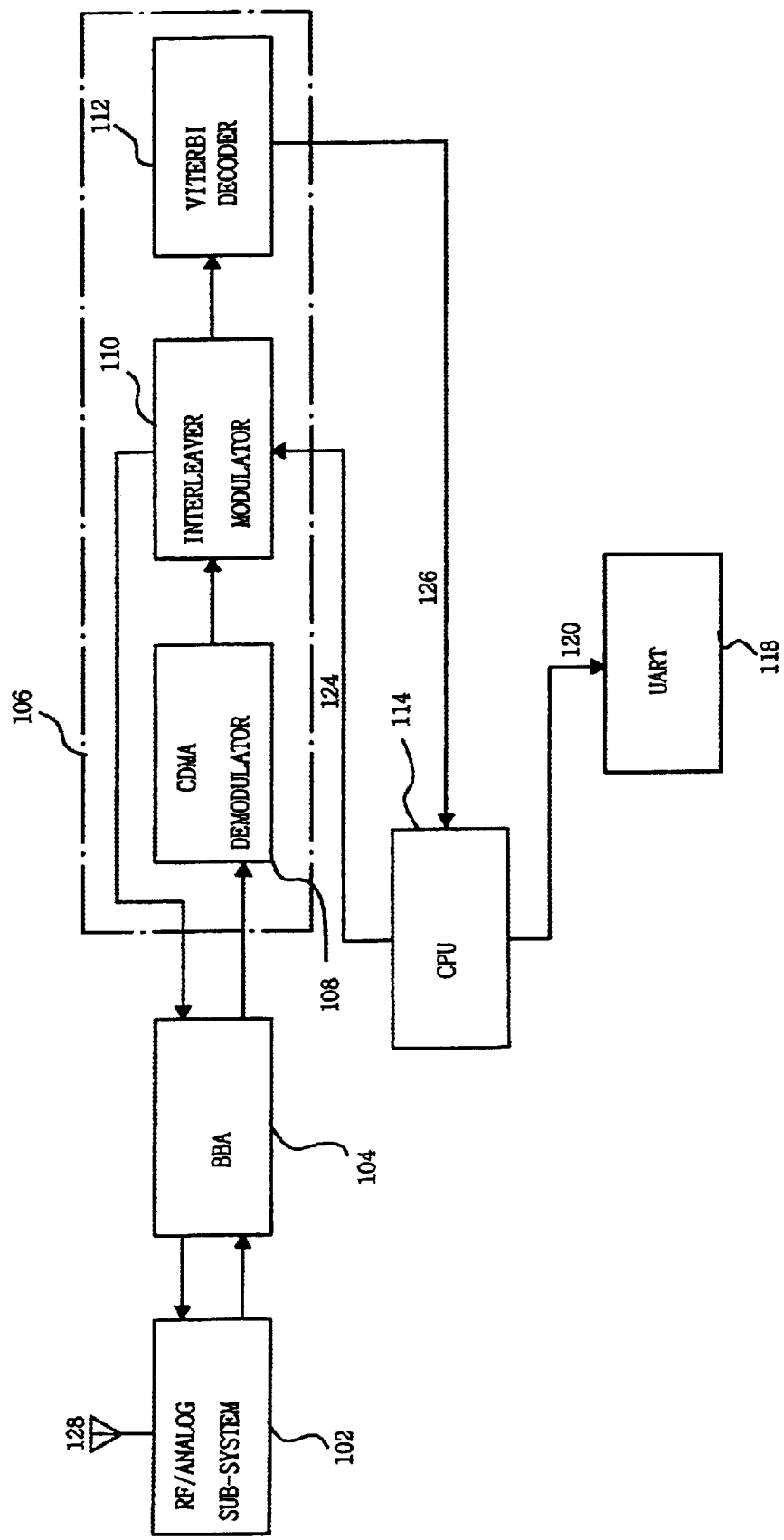
FIG. 1 is a block diagram showing a configuration of a conventional CDMA cellular phone.
Figure 2:
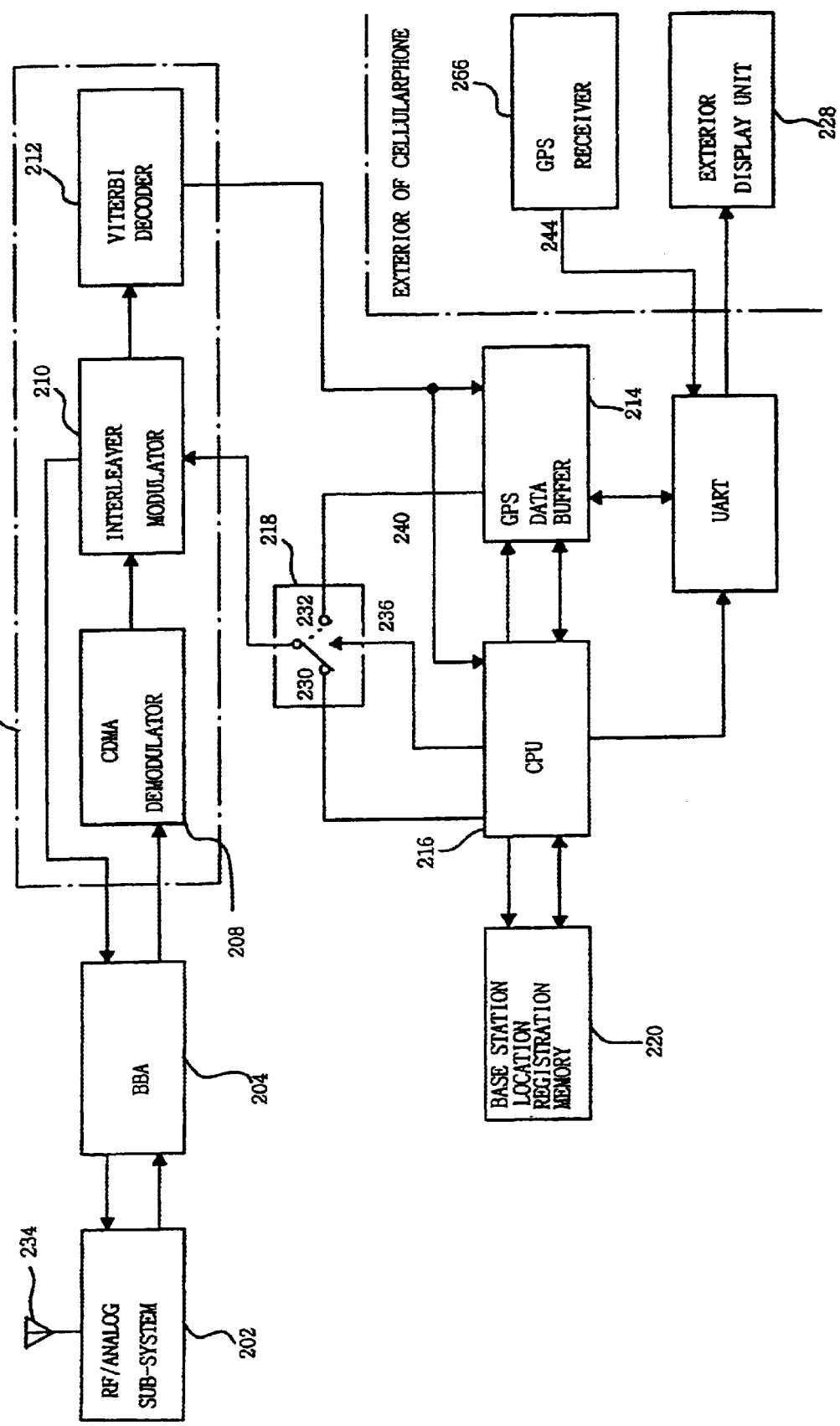
FIG. 2 is a block diagram showing a configuration of a CDMA cellular phone according to the present invention.

FIG. 2 is a block diagram showing a configuration of a CDMA cellular phone according to the preferred embodiment of the present invention. As shown in FIG. 2, RF/analog sub-system 202 performs frequency synchronization of received signals and power control of transmitting signals and generates system clocks. Baseband analog (BBA) 204 comprises up/down converter and filter, a D/A converter, and an A/D converter. The baseband analog 204 processes voice data that is not modulated. Mobile station modem (MSM) 206 comprises CDMA demodulator 208, interleaver modulator 210, and Viterbi decoder 212. The CDMA demodulator 208 demodulates the received signals. The interleaver modulator 210 modulates and sends the transmitting signals to the baseband analog 104. The Viterbi decoder 212 compensates the received signals for errors. Universal asynchronous receiver transmitter (UART) 224 is an input/output interface connecting to exterior devices.

The CDMA cellular phone according to the preferred embodiment of the present invention includes GPS data buffer 214. The GPS data buffer 214 stores forward GPS data or backward GPS data. The forward GPS data is transmitted from a base station to a mobile station while the backward GPS data is transmitted from the mobile station to the base station.

Input and output of the GPS data buffer 214 is controlled by CPU 216. The output of the GPS data buffer 214 is the backward GPS data and input into switch 218. The switch 218 also has general transmitting data 238 from the CPU 216 as its input. The general transmitting data 238 is normal voice data to be transmitted from the CDMA cellular phone. The CPU 216 generates a switch control signal 236 to control one of the general transmitting data 238 and the backward GPS data 240 to be sent to the interleaver modulator 210 in the mobile station modem 206.

The input of the GPS data buffer 214 is the forward GPS data and received via two paths. First forward GPS data 242 is input to the GPS data buffer 214 via a first path comprising the RF/analog sub-system 234, BBA 204, and MSM 206. Second forward GPS data 244 is data received by exterior GPS receiver 226 and is input to the GPS data buffer 214 via a second path comprising the UART 224.

The UART 224 is controlled by a UART control signal 246 generated by the CPU 216. The UART 224 transmits the GPS data (forward or backward) stored in the GPS data buffer 214 to exterior display unit 228. The exterior display unit 228 displays location information and time information on a map. Consequently, a user can recognize from the content displayed through the exterior display unit 228, a location or a mobile locus at the time when the GPS data was transmitted.

Location information of each base station is registered in base station location registration memory 220. The CPU 216 calculates base station information contained in the received first forward GPS data 242 and compares the calculated information with the data registered in the base station location registration memory 220 to obtain location information at the time when the first forward GPS data was transmitted.

Figure 3:
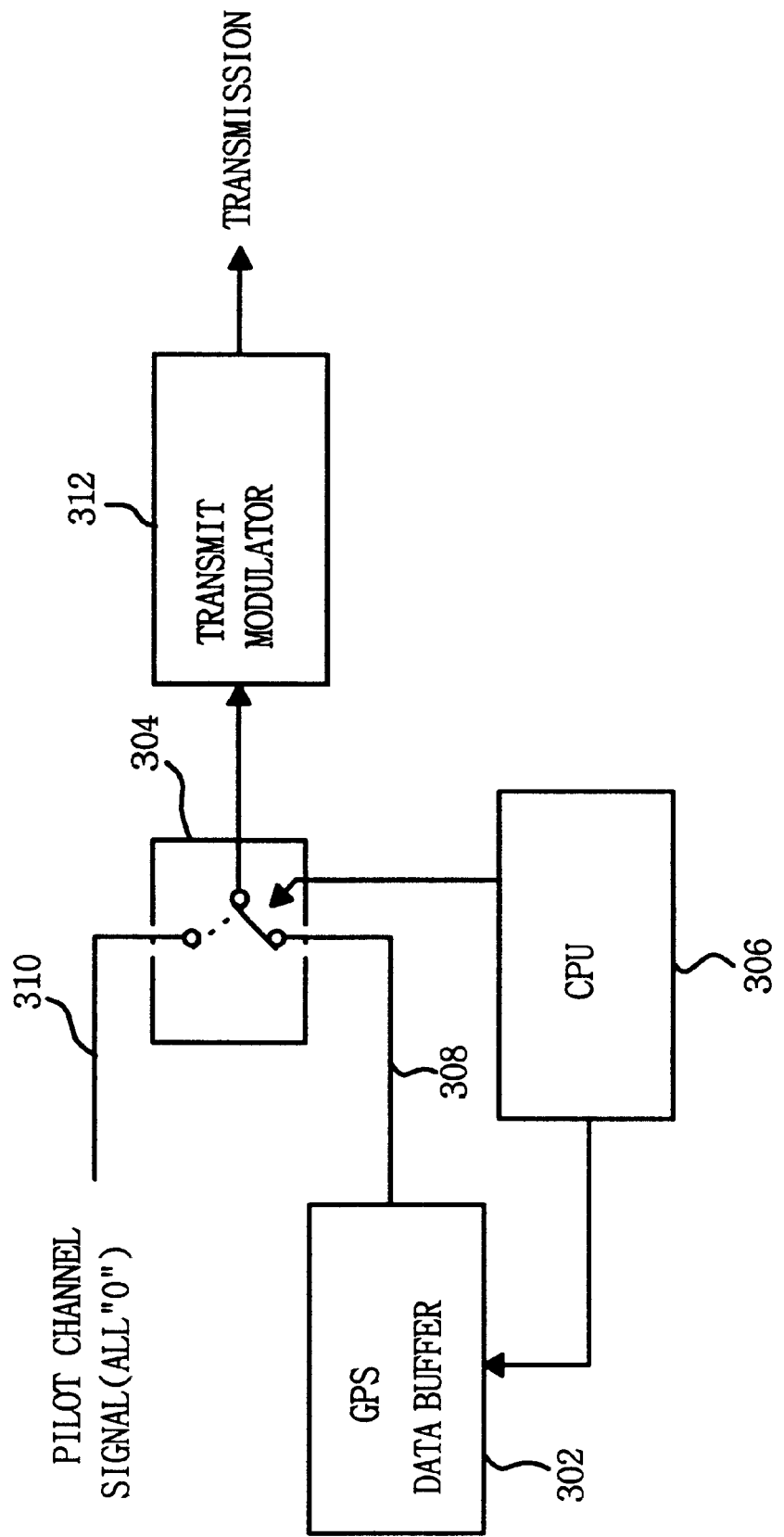
FIG. 3 is a block diagram showing a configuration of a base station for forward GPS data transmission.

To allow such CDMA cellular phone according to the preferred embodiment of the present invention to transmit and receive the GPS data, the base station should be equipped with a GPS data buffer compatible with the GPS data buffer in the mobile station and operate the buffer. FIG. 3 is a block diagram showing a configuration of the base station for forward GPS data transmission. As shown in FIG. 3, switch 304 is controlled by the CPU 306 and provides to transmit modulator 312, one of forward GPS data 308 output from GPS data buffer 302 and a pilot channel signal 310.

Figure 4:
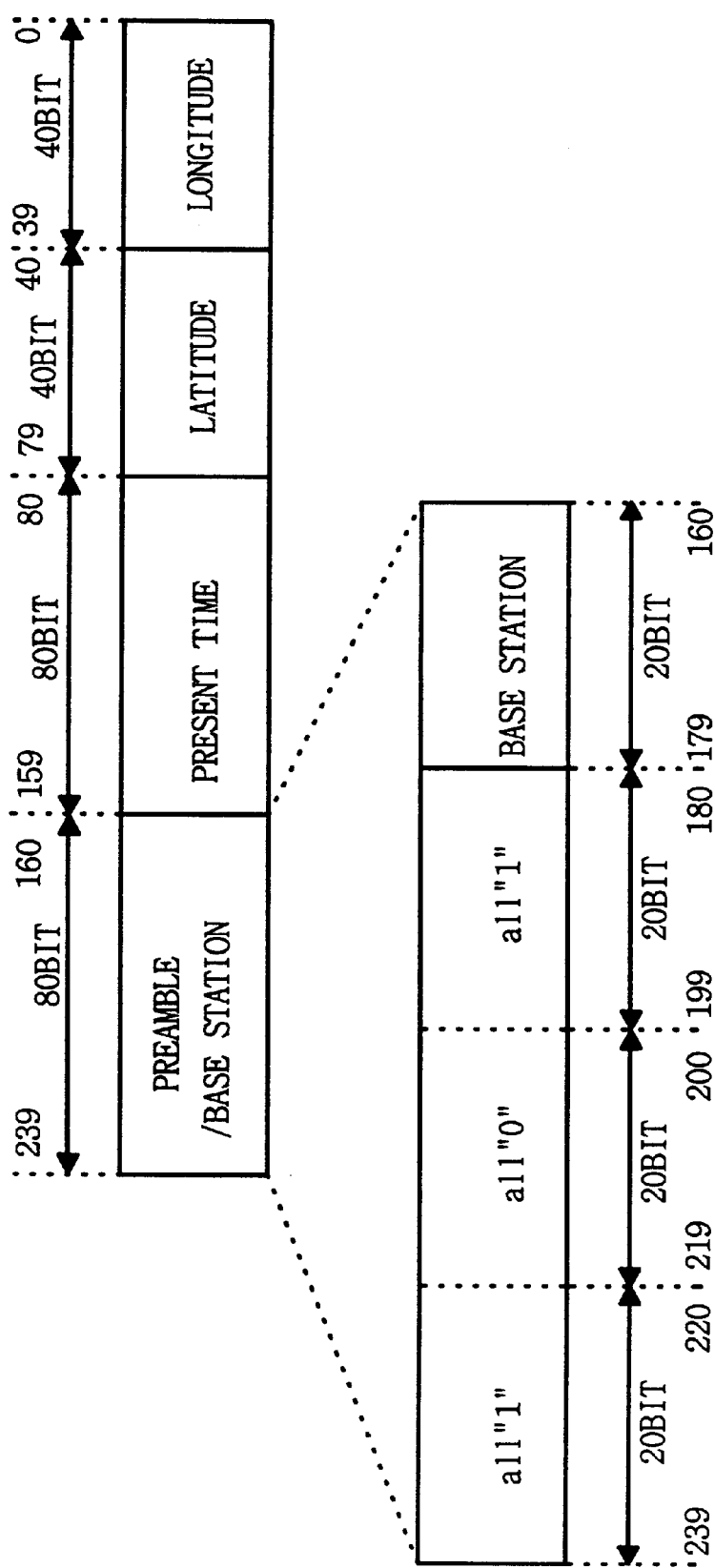
FIG. 4 shows a configuration of a GPS data buffer according to the present invention.

FIG. 4 shows a configuration of the GPS data buffer according to the preferred embodiment of the present invention. As shown in FIG. 4, the GPS data buffer according to the preferred embodiment of the present invention has memory capacity of at least 240 bits. Preamble and base station information is stored in an upper 80-bit area. In the next 80-bit area is stored a present time, namely, time information on the time when the GPS data is transmitted. In a lower 80-bit area is stored location information. The area for the location information is divided into a 40-bit latitude information storage area and a 40-bit longitude information storage area.

The preamble is stored in the upper 60-bit area in the upper 80-bit area storing the preamble and the base station information. In the remaining 20-bit area is stored the base station information. For the preamble, the upper 20 bits are logic "1", the next 20 bits are logic "0", and the remaining 20 bits are logic "1". Such sequence of the preamble of the GPS data is different from a preamble of the general transmitting data, thereby discriminating the GPS data from the general transmitting data.

Figure 5A:
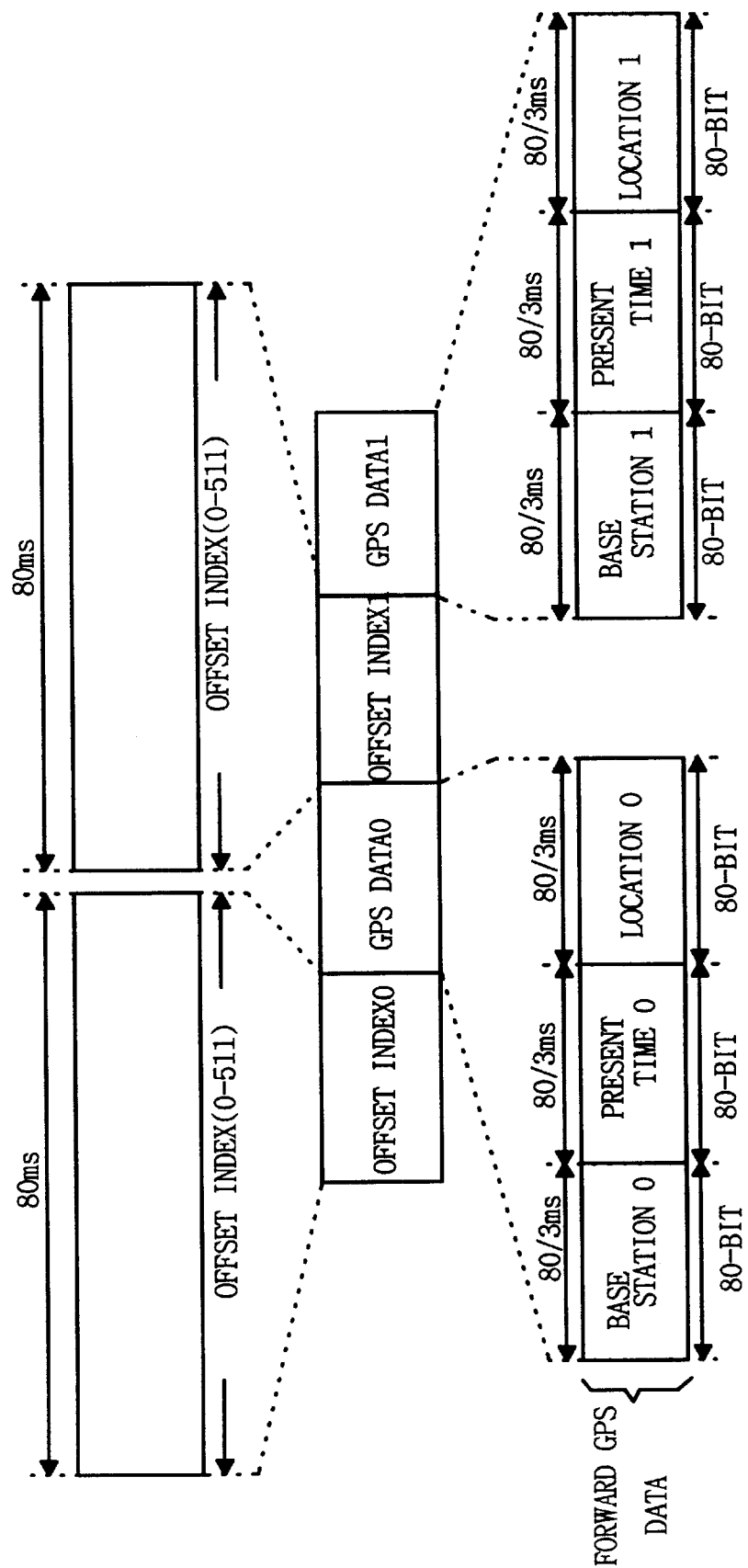
FIG. 5a shows a format of forward GPS data according to the present invention.

FIG. 5a shows a format of the forward GPS data according to the preferred embodiment of the present invention. As shown in FIG. 5a, the forward GPS data according to the preferred embodiment of the present invention is alternately transmitted with a synchronization offset index. One synchronization offset index block comprises total 512 unit offset indexes (0–511) and has a transmission time of 80 ms. The forward GPS data comprises 80-bit base station information, 80-bit time information, and 80-bit location information. One GPS data also has a transmission time of 80 ms. Each of the base station information, time information, and location information is transmitted for 80/3 ms.

Figure 5B:
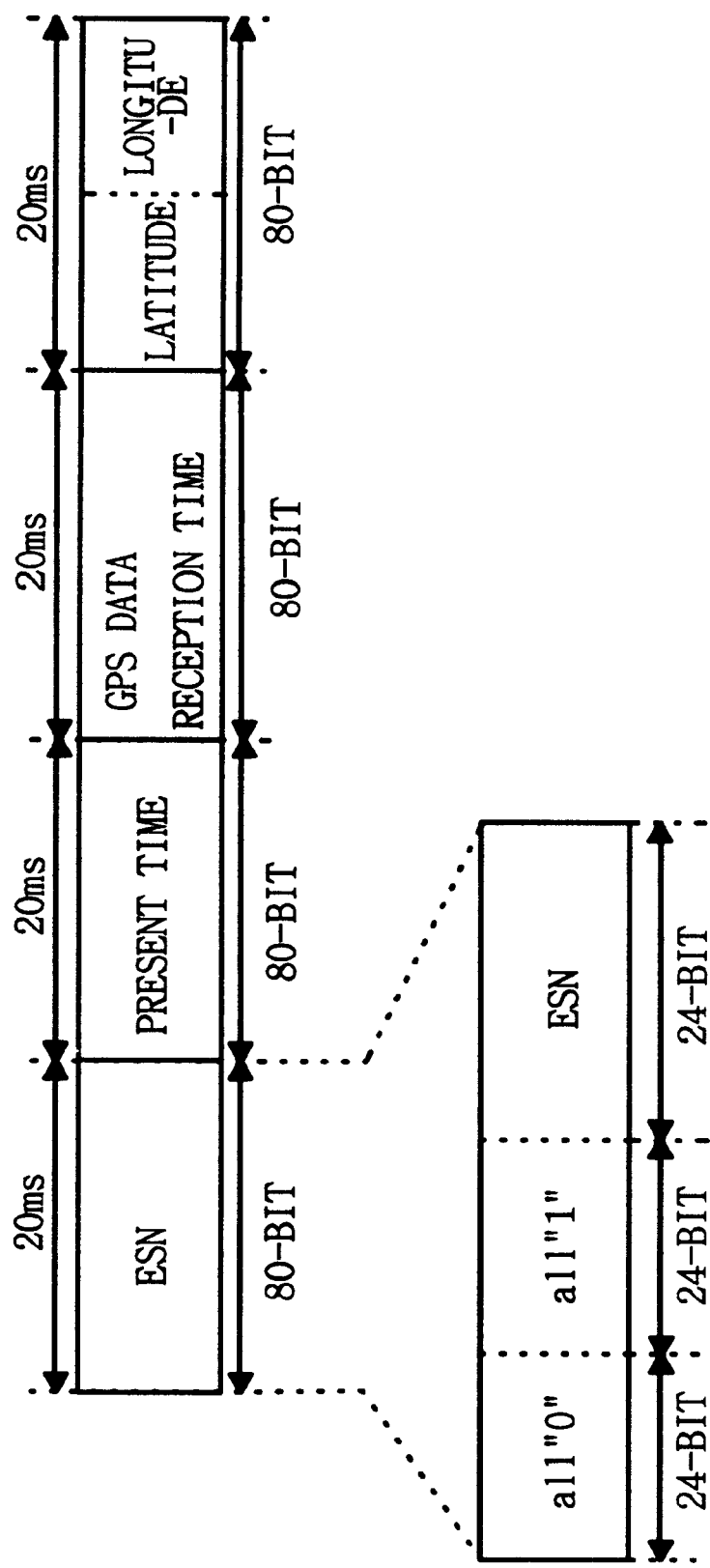
FIG. 5b shows a format of backward GPS data according to the present invention.

FIG. 5b shows a format of the backward GPS data according to the preferred embodiment of the present invention. As shown in FIG. 5b, the backward GPS data comprises 80-bit electronic serial number (ESN) information, 80-bit present time information, 80-bit GPS data receiving time information, and 80-bit location information. The backward GPS data also has a transmission time of 80 ms.

Accordingly, each of the ESN information, present time information, GPS data receiving time information, and location information has a transmission time of 20 ms.

The ESN is a unique number allocated to each cellular phone. The ESN data according to the preferred embodiment of the present invention actually includes a 48-bit preamble. For the preamble, upper 24 bits all have a logic value "0" and the next 24 bits all have a logic value "1". The remaining 32 bits except the preamble represent an actual value of the ESN. In other words, the first 24 bits transmit "all 0" and the next 24 bits transmit "all 1" before the actual ESN data is transmitted. The preamble of the backward GPS data has inverted logic values in order to be discriminated from the preamble of the forward GPS data (all 1, all 0, all 1). The preamble of the backward GPS data not only represents that the corresponding data is the GPS data but also is used for obtaining a time for the synchronization with the base station. The location information includes 40-bit latitude information and 40-bit longitude information.

Figure 6:
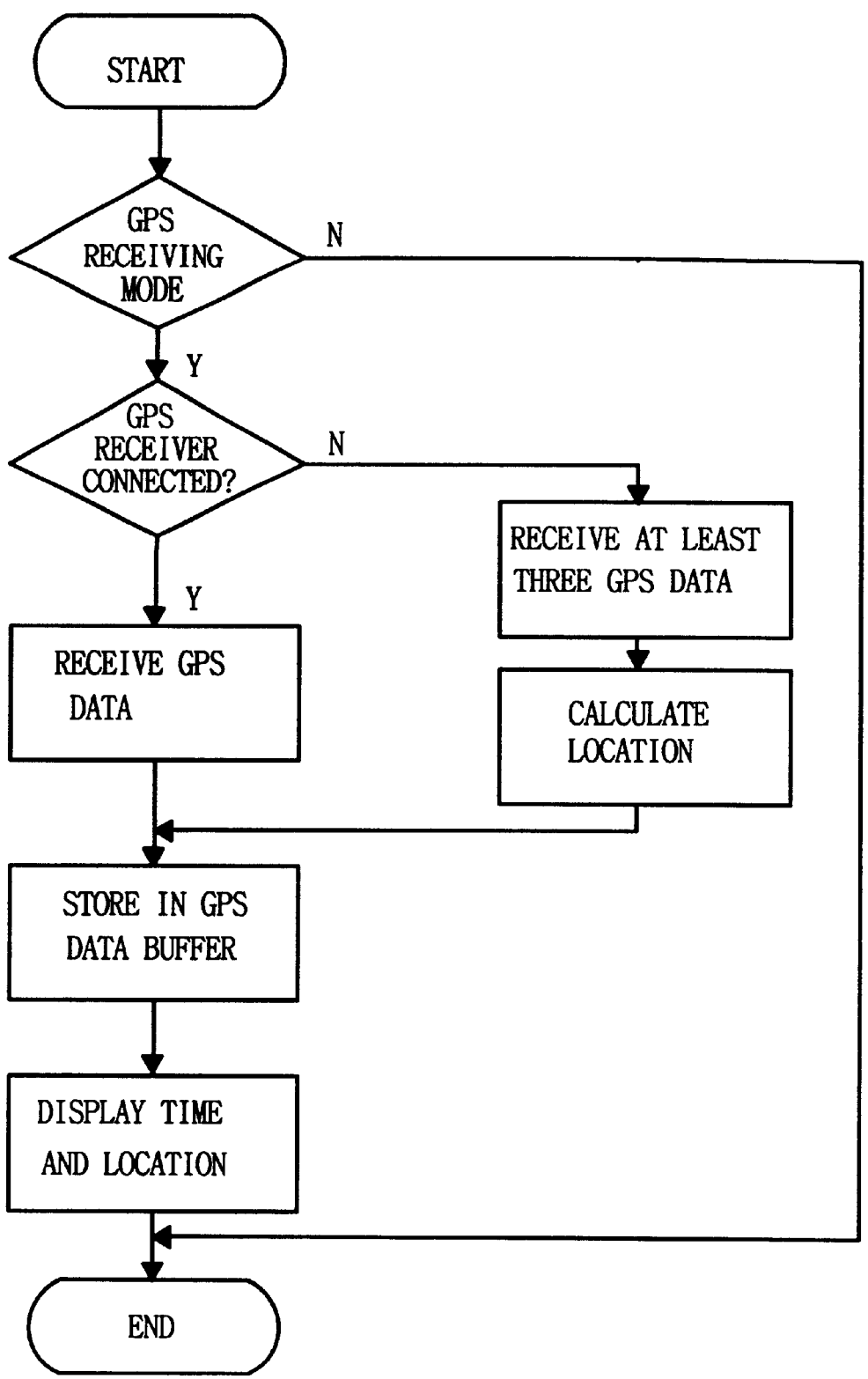
FIG. 6 is a flow chart showing how a CDMA cellular phone receives GPS data according to the present invention.

How the CDMA cellular phone according to the preferred embodiment of the present invention receives the forward GPS data depends on the connection state of the GPS receiver. FIG. 6 is a flow chart showing how the CDMA cellular phone receives the GPS data according to the preferred embodiment of the present invention. As shown in FIG. 6, if the GPS receiver is connected in a GPS receive mode, the CDMA cellular phone of the preferred embodiment of the present invention receives the forward GPS data via the GPS receiver. The received GPS data is stored in the GPS data buffer. The time information and the location information obtained from the received GPS data is displayed on the map of the exterior display unit.

Alternatively, if the GPS receiver is not connected, the CDMA cellular phone directly receives at least three pieces of GPS data from different base stations. Once at least three pieces of the GPS data are received, the location information is calculated from the received GPS data and a result of the calculation is stored in the GPS data buffer. The calculation of the location information is internally performed within the mobile station, namely, the CDMA cellular phone according to the preferred embodiment of the present invention. The location and time information stored in the GPS data buffer is transmitted to the exterior display unit through the UART so as to be displayed on the map.

Figure 7:
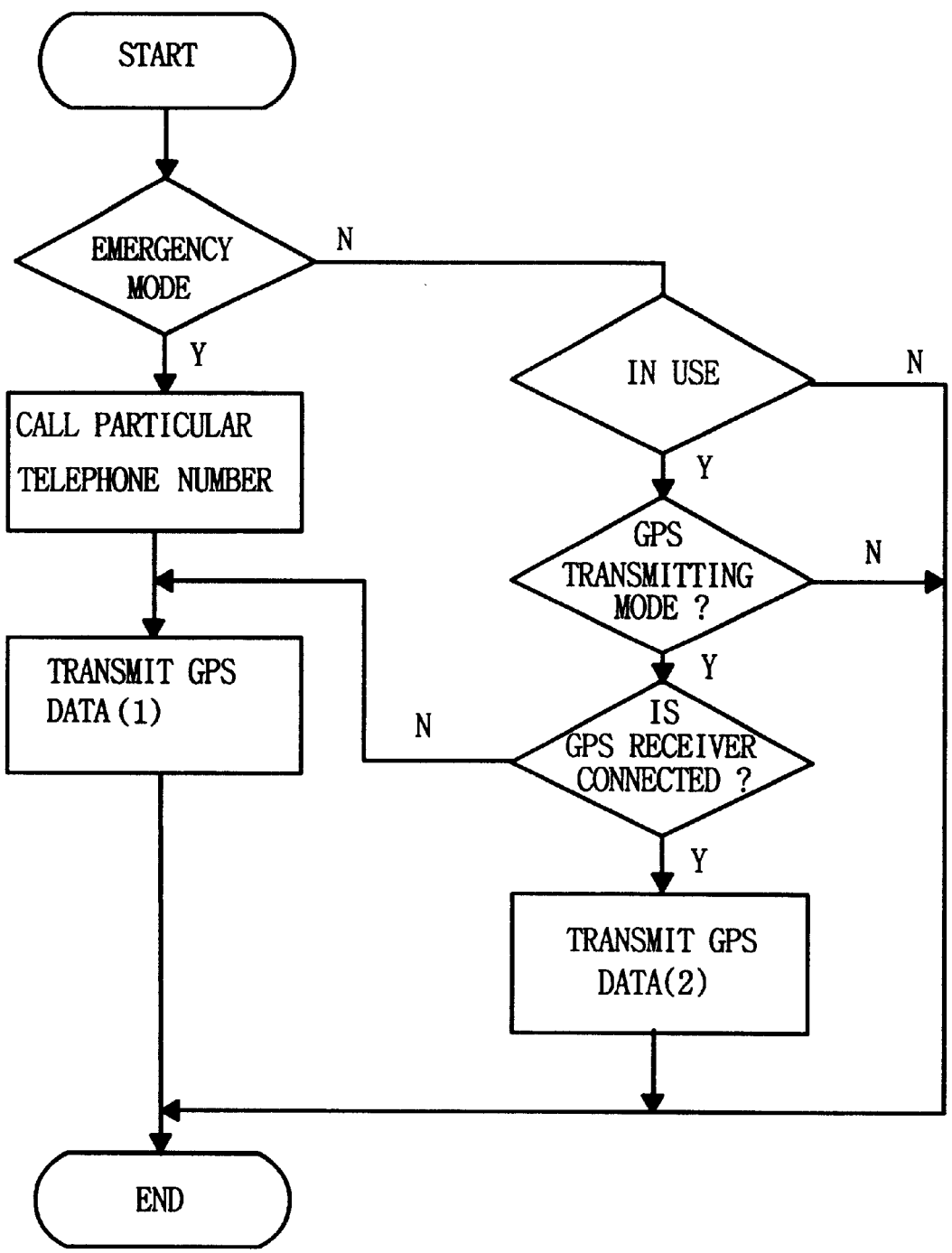
FIG. 7 is a flow chart showing how a CDMA cellular phone transmits GPS data according to the present invention.

The transmission of the backward GPS data by the CDMA cellular phone according to the preferred embodiment of the present invention depends upon operation modes. Specifically, the transmission methods are different according to an emergency mode and a normal mode. FIG. 7 is a flow chart showing how the CDMA cellular phone transmits the GPS data according to the preferred embodiment of the present invention. As shown in FIG. 7, if the CDMA cellular phone is set to the emergency mode, a preselected particular telephone number is called and then the backward GPS data stored in the GPS data buffer is transmitted ((1) in FIG. 7).

If the CDMA cellular phone is not in the emergency mode, it is checked to find whether or not it is connected for communications. If not in use, the data transmission does not further progress. If connected, the CDMA cellular phone is checked to find whether or not it is in a GPS transmission mode. If not in the GPS transmission mode, the data transmission does not further progress. If in the GPS transmission mode, the GPS receiver is checked to find whether or not it is connected. If the GPS receiver is not connected, the GPS data transmitting step in the emergency mode described above ((1) in FIG. 7) progresses. If the GPS receiver is connected, the GPS data is transmitted using the other method ((2) in FIG. 7).

Figure 8:
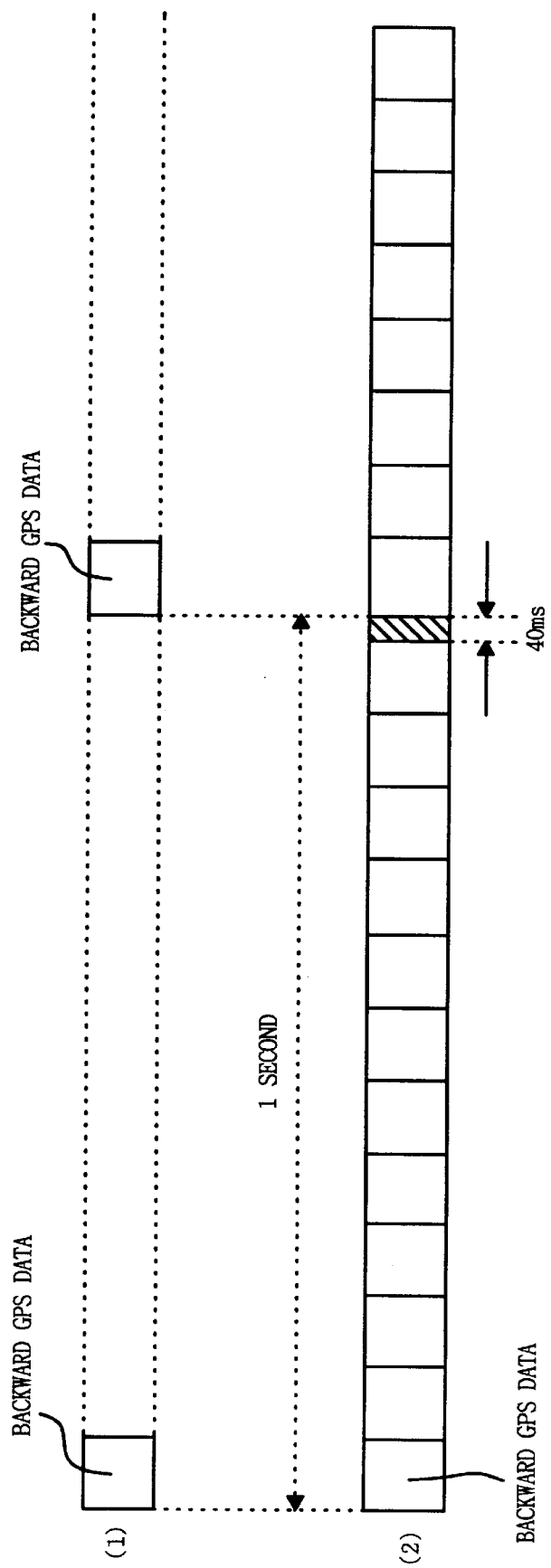
FIG. 8 shows how GPS data is transmitted in accordance with operation modes of a CDMA cellular phone according to the present invention.

As illustrated above, the backward GPS data transmission of the CDMA cellular phone according to the preferred embodiment of the present invention is performed using different methods in the respective emergency mode and normal mode. FIG. 8 shows how the GPS data is transmitted in accordance with the preferred embodiment of the operation mode of the CDMA cellular phone according to the present invention. As shown in FIG. 8(1), when a state of emergency occurs (namely, in the emergency mode), one block of the backward GPS data is transmitted per second to deliver the location information and mobile locus information stored in the GPS data buffer to a particular telephone number.

The CDMA cellular phone transmits backward GPS data blocks as many as can be transmitted for one second to provide its location information to a called party when it is connected for communication. One backward GPS data block has transmission time of 80 ms, so, for total 1 second, 12 blocks are transmitted and then blank data is transmitted for the remaining 40 ms.

As illustrated above, the present invention adds GPS data transmit and receive functions to the CDMA cellular phone and allows location information to be calculated from received GPS data to enable a user to transmit his/her location information to a base station or another user and recognize a present location based upon the GPS data transmitted from the base station through the CDMA cellular phone. Therefore, in case of emergency, the CDMA cellular phone can exchange location information and time information with the base station and another mobile station.

It will be apparent to those skilled in the art that various modifications and variations can be made in a GPS data controller in mobile communication system and control method thereof according to the present invention without deviating from the spirit or scope of the invention. Thus, it is intended that the present invention covers the modifications and variations of this invention provided they come within the scope of the appended claims and their equivalents.

What is claimed is:

1. A mobile communication system comprising:
   signal processing means for receiving first forward Global Positioning System (GPS) data and transmitting backward GPS data;
   first memory means for storing said backward GPS data, said first forward GPS data, and second forward GPS data received by an exterior GPS receiver;
   control means for controlling data input and output over said first memory means and for controlling transmission of said backward GPS data stored in said first memory means to said signal processing means; and
   input-output control means controlled by said control means, for transmitting said second forward GPS data to said first memory means.

2. A mobile communication system according to claim 1, wherein second memory means is connected to said control means and stores location information of each base station.

3. A mobile communication system according to claim 1, wherein said first and second forward GPS data is alternately transmitted with synchronizing offset indexes.

4. A mobile communication system according to claim 1, wherein said first and second forward GPS data includes base station information, first time information, and first location information.

5. A mobile communication system according to claim 1, wherein said backward GPS data includes preamble, second time information, and second location information.

6. A mobile communication system according to claim 5, wherein said preamble includes at least one unique number data.

7. A mobile communication system according to claim 5, wherein said second location information includes latitude data and longitude data.

8. A mobile communication system according to claim 1, wherein said memory means includes a preamble area, a base station information area, a time information area, and a location information area.

9. A mobile communication system according to claim 8, wherein said location information area comprises a latitude data area and a longitude data area.

10. A mobile communication system according to claim 1, wherein said control means outputs general transmitting data and performs control to provide one of said backward GPS data and said general transmitting data to said signal processing means.

11. A mobile communication system according to claim 1, wherein said input-output control means provides said second forward GPS data received by the exterior GPS receiver to said first memory means.

12. A mobile communication system according to claim 1, wherein said input-output control means provides said first and second forward GPS data stored said first memory means to an exterior display unit.

13. The mobile communication system of claim 1, wherein the input-output control means transmits said backward GPS data stored in the first memory means to an external display unit.

14. A mobile communication system comprising:
   a signal processor receiving first forward Global Positioning System (GPS) data and transmitting backward GPS data;
   a first memory storing said backward GPS data, said first forward GPS data, and second forward GPS data received by an exterior GPS receiver;
   a first controller controlling data input and output over said first memory and controlling transmission of said backward GPS data stored in said first memory to said signal processor; and
   input-output controller controlled by said first controller and transmitting said second forward GPS data to said first memory.

15. A mobile communication system according to claim 14, wherein second memory is connected to said first controller and stores location information of each base station.

16. A mobile communication system according to claim 14, wherein said first and second forward GPS data is alternately transmitted with synchronizing offset indexes.

17. A mobile communication system according to claim 14, wherein said first and second forward GPS data includes base station information, first time information, and first location information.

18. A mobile communication system according to claim 14, wherein said backward GPS data includes preamble, second time information, and second location information.

19. A mobile communication system according to claim 18, wherein said preamble includes at least one unique number data.

20. A mobile communication system according to claim 18, wherein said second location information includes latitude data and longitude data.

21. A mobile communication system according to claim 14, wherein said first memory includes a preamble area, a base station information area, a time information area, and a location information area.

22. A mobile communication system according to claim 21, wherein said location information area comprises a latitude data area and a longitude data area.

23. A mobile communication system according to claim 14, wherein said first controller outputs general transmitting data and performs control to provide one of said backward GPS data and said general transmitting data to said signal processor.

24. A mobile communication system according to claim 14, wherein said input-output controller provides said second forward GPS data received by the exterior GPS receiver to said first memory.

25. A mobile communication system according to claim 14, wherein said input-output controller provides said first and second forward GPS data stored in said first memory to an exterior display unit.

26. The mobile communication system of claim 14, wherein the input-output controller transmits said backward GPS data stored in the first memory to an external display unit.

* * * * *